Figure 1:
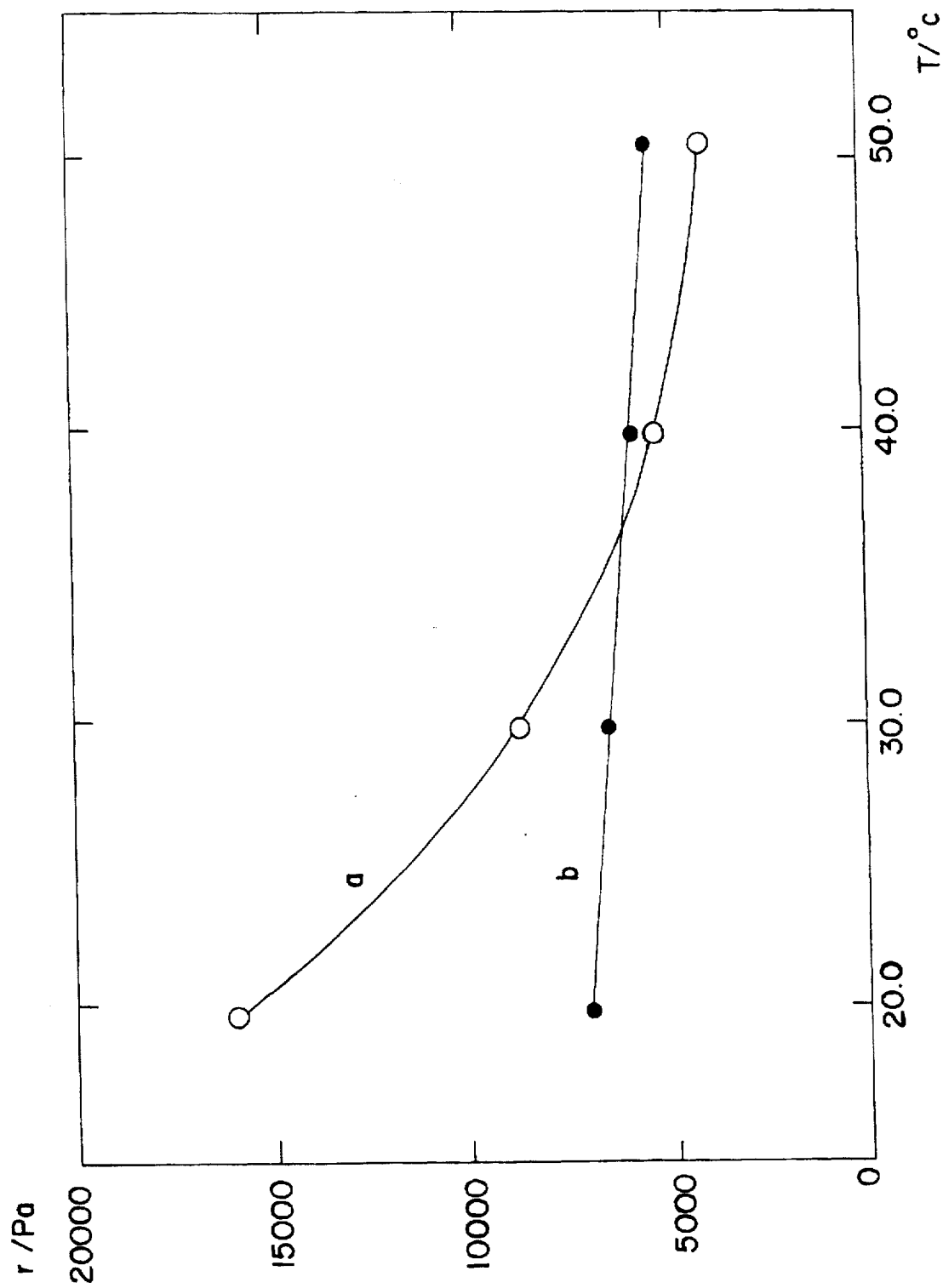

United States Patent [19]
Proebster et al.

[11] Patent Number: 5,747,581
[45] Date of Patent: May 5, 1998

[54] ADHESIVE AND SEALING MATERIAL

[76] Inventors: Manfred Proebster, Friedrich-Ebert-Str. 4, 69226 Nussloch, Germany; Manfred Schumann, Burgstr. 24, 69121 Heidelberg, Germany

[21] Appl. No.: 564,363
[22] PCT Filed: Jun. 21, 1993
[86] PCT No.: PCT/EP93/01584
  § 371 Date: Dec. 21, 1995
  § 102(e) Date: Dec. 21, 1995
[87] PCT Pub. No.: WO95/00572
  PCT Pub. Date: Jan. 5, 1995
[51] Int. Cl.$^6$ ............... C08J 3/00; C08K 3/20; C08L 78/00; B65C 9/25
[52] U.S. Cl. ............ 524/590; 156/320; 156/331.4; 156/331.7; 427/208.2; 427/372.2; 427/385.5; 427/388.1; 427/389.7; 524/589; 525/440; 525/457
[58] Field of Search ............... 524/589, 590; 525/440, 457; 427/208.2, 372.2, 385.5, 388.1, 389.7; 156/320, 331.4, 331.7

[56] References Cited

U.S. PATENT DOCUMENTS

| | | | |
|---|---|---|---|
| 3,971,751 | 7/1976 | Isayama et al. | 260/37 |
| 4,352,858 | 10/1982 | Stanley | 428/423.1 |
| 4,672,100 | 6/1987 | Schoenbaechler et al. | 528/75 |
| 4,778,845 | 10/1988 | Tschan et al. | 524/710 |
| 4,780,520 | 10/1988 | Rizk et al. | 528/53 |
| 5,155,180 | 10/1992 | Takada et al. | 525/440 |

FOREIGN PATENT DOCUMENTS

| | | |
|---|---|---|
| 153456 | 9/1985 | European Pat. Off. . |
| 217289 | 4/1987 | European Pat. Off. . |
| 255572 | 2/1988 | European Pat. Off. . |
| 281905 | 9/1988 | European Pat. Off. . |
| 310704 | 4/1989 | European Pat. Off. . |
| 317012 | 4/1989 | European Pat. Off. . |
| 244608 | 11/1989 | European Pat. Off. . |
| 340906 | 11/1989 | European Pat. Off. . |
| 351728 | 1/1990 | European Pat. Off. . |
| 340164 | 5/1990 | European Pat. Off. . |
| 369607 | 5/1990 | European Pat. Off. . |
| 455400 | 11/1991 | European Pat. Off. . |
| 3140884 | 6/1982 | Germany . |
| 3909127 | 10/1990 | Germany . |
| 4023801 | 1/1991 | Germany . |
| 4023804 | 1/1991 | Germany . |
| 4210277 | 9/1993 | Germany . |
| 2234516 | 2/1991 | United Kingdom . |

*Primary Examiner*—Patrick Niland
*Attorney, Agent, or Firm*—Ernest G. Szoke; Wayne C. Jaeschke; Real J. Grandmaison

[57] ABSTRACT

An adhesive and sealing material contains a) at least one reactive prepolymer which is liquid at room temperature and b) at least one further component which is solid at room temperature, liquid at a slightly raised temperature and at least partially incompatible with the liquid prepolymer(s). Component b) is preferably liquid at a temperature of max. 50° C.

17 Claims, 1 Drawing Sheet

ADHESIVE AND SEALING MATERIAL

BACKGROUND OF THE INVENTION

1. Field of the Invention

The present invention relates to adhesive and sealing masses with very good stability and high initial carrying capacity, and their use for the gluing of materials and components in metal and car body construction, for example in direct glazing of automobile windows. The invention is described in the following with reference to this use, but is not restricted to it, being suitable for the gluing of components made of the same material or different materials.

Polyurethane adhesive and sealing materials play since several years a significant role in numerous technical applications. Their high elasticity, combined with excellent tensile strength and resistance to tearing, their broad adhesive range with and without primer, as well as their advantageous price/performance ratio, allow them to appear particularly suitable for the automobile industry. Thus, it has become accepted to use PU materials in particular even for directly glazing vehicle windows. Pasty, highly-viscous adhesive and sealing masses are used for these applications, which normally are deposited on the car body flange or glass pane by robots. Most of these products consist of one component and harden over the course of a few hours to a few days by the reaction of the isocyanate groups, optionally capped, contained therein with penetrating atmospheric moisture to produce a high-grade elastomer.

2. Discussion of Related Art

It is a disadvantage of the single-component adhesive and sealing masses known up until now that, for the adhesive composite to reach a certain minimum strength, a period of at least 1 to 2 hours must elapse. As a rule, therefore, fixing agents must be used for inserting the panes in order to prevent them slipping out during subsequent assembly work. Numerous processes have been described which attempt to remedy this failing. For example, using two-component materials as are described in EP-A-153 456 or EP-A-281 905, a hardening is achieved which is, as a rule, faster and independent of the atmospheric moisture. It is, however, a disadvantage for the users of this system that they are more difficult to master with regard to apparatus, and that, because of the presence of two components, mixing and dosage errors can arise.

It was also attempted in the case of the 1-C materials to obtain a faster strength build-up during the initial phase of hardening. This is achieved, for example, by using special accelerators, as is described in EP-A-312 012, EP-A-370 164 or U.S. Pat. No. 4,780,520, or by other chemical activation, e.g. by injecting an activator or treating with steam, as is shown in EP-A-351 728 or DE-A-39 09 127. It is not, however, possible to achieve with this process an effective adhesion and fixing directly after applying the sealing material bead, which, for example, prevent the glued pane from slipping out within the first few minutes during direct glazing. A further disadvantage of the systems cited in EP-A-312 012 and EP-A-370 164 and U.S. Pat. No. 4,780,520, which contain very active catalysts, is a relatively short shelf-life.

A further developmental direction forming part of the prior art deals with reactive hot melts, like those described e.g. in EP-A-244 608, EP-A-310 704, EP-A-340 906, EP-A-369 607 and EP-A-455 400, or with pre-crosslinking systems, as described in EP-A-255 572 and DE-A-40 23 804. Common to these processes, useful per se, is the disadvantage that the adhesive sealing material has to be applied at rather high temperatures (at least 80° C). With the great majority of these moisture-hardening hot melt materials, the moisture-hardening is very slow because of the severely impeded diffusion of the atmospheric moisture. These adhesive compositions must therefore achieve a considerable part of their strength by the liquid/solid phase transition during cooling. For this reason these adhesive/sealing materials already display a very high viscosity increase directly after application, which makes the insertion of the panes into the car-body possible only with increased energy expenditure. At the same time, it is more difficult to guarantee wetting of the glass surfaces by the sealing material, and therefore a good adhesion. GB 22 34 516 proposes a moisture-hardening hot melt composition which, although basically suitable for the gluing of windscreens, has three crucial disadvantages:

- the choice of the "soft segment" and "hard segment" polyols needed therein is narrowly limited, since these have to be compatible with each other,
- the production process of the prepolymers requires at least 3 steps in a definite sequence,
- the application temperature of the adhesive/sealing material is very high (120° C).

DESCRIPTION OF THE INVENTION

It is the object of the present invention to develop adhesive and sealing materials which no longer show the disadvantages mentioned above. This is achieved, surprisingly, with an adhesive and sealing material based on reactive prepolymers, which contains a) at least one reactive prepolymer which is liquid at room temperature, and b) at least one further component which is solid at room temperature, liquid at a slightly raised temperature, and at least partially incompatible with the liquid prepolymer(s). Component b) is preferably liquid at a temperature of at maximum 60° C., particularly 50° C. This involves substances with a relatively narrow melting range and comparatively low viscosity in molten state, i.e. not usual thermoplastics with a broad, little-desired, softening range. A further important feature of this constituent is its at least partial incompatibility with the one or the other prepolymers contained in the formulation. A sufficient incompatibility exists if, when the adhesive and sealing material cools below the melting point of the component solid at room temperature, the same begins to solidify into very fine particles and the solid proportion increases at the cost of the viscous-liquid phase in the sealing material.

Component b) is preferably liquid at a temperature of max. 60 and in particular 50°0 C., and the melting range can lie in particular between 35° and 50° C. Especially preferred as component b) are polymers or prepolymers, which can have reactive functional groups, but do not necessarily have them. Prepolymers with isocyanate end-groups have proved particularly favourable both for component a) and for component b). The prepolymers can be obtained by a method known in itself by reacting linear or branched polyols of the group of polyethers, polyesters, polycarbonates, polycaprolactones, polycaprolactams or polybutadienes with di- or polyfunctional isocyanates. As component b), prepolymers which can be produced from polycaprolactone polyols as polyol component and di- or polyfunctional isocyanates have proved particularly successful. The preferred prepolymers are reaction products of the said polyols with aromatic or aliphatic diisocyanates, e.g. 4,4'-diphenyl methane diisocyanate, 2,2'- and 2,4'-toluylene diisocyanate, 1,5-naphthylene diisocyanate, 1,4-phenylene diisocyanate, hexamethylene diisocyanate, isophorone diisocyanate, m-tetramethylxylylene diisocyanate and others.

It is, however, also possible to use as component b) polymers or prepolymers which have no NCO-groups as reactive groups but satisfy the requirements for incompatibility as well as hardening at room temperature. Polymers suitable as components a) and/or b) can have e.g. functional silane or mercapto groups at the chain ends, through which a crosslinking can occur. Preferred for this purpose are the liquid polyether prepolymers, known per se, with moisture-reactive silane groups, as are described e.g. in U.S. Pat. No. 3,971,751 or in EP-A-217 289. Other suitable compounds are also conceivable as component b), which do not necessarily belong to the class of polymer compounds, if they satisfy the above criteria of narrow melting point range barely above room temperature and of incompatibility. Inert low-molecular-weight organic compounds with narrowly limited melting range, such as e.g. waxes or paraffins, preferably microcrystalline waxes, come into consideration here.

A suitable choice of the polymers/prepolymers solid at room temperature results in products which are readily pumpable and easily processable even on slight warming to 50° to 60° C. and particularly 40° to 50° C. At room temperature, on the other hand, the masses according to the invention are very rigid and resistant, but on the other hand are still sufficiently mouldable under pressure. In this way, an excellent initial carrying capacity is achieved for the sealing material applied as a bead.

In contrast to hot-melt-type products according to EP-A-244 608 or EP-A-410 704, the masse is not at all viscously plastic in this state, but furthermore pasty and smoothable (flattable). This also permits simple corrections in application during large-surface gluing such as, e.g. in bus construction and the insertion and positioning of large-surface components such as window panes in automobile body construction.

The specialist is furthermore aware of the fact that many cooling hot melts have a tendency to form very long threads. This is not the case with the masses according to the invention. A further advantage of the sealing masses according to the invention is the low temperature of only ca. 40° to 50° C. necessary for their "liquefaction". Since no gelation reaction has to proceed either, as described say in EP-A-255 572 or U.S. Pat. No. 4,778,845, the heating-up can be carried out relatively quickly and unregulated. The thickening of the material which occurs on cooling after application does not, however, proceed so quickly that corrections to the gluing would no longer be possible. Rather, the window pane can still be positioned easily.

A few minutes later the adhesive and sealing masses according to the invention have a rigidity which is far greater than that of conventional materials still pumpable at room temperature. The use of fixing aids after pane assembly can thereby be completely dispensed with, and the car bodies can be moved on practically straight away, which has an advantageous effect on the cycle times in the mass production of the automobile industry. In the case of repairs, a shorter stay in the workshop and a fast return of the motor vehicle to running order is achieved in this way after replacing a car window. The solidifying polymer can, so long as it contains reactive end- or side-groups, be incorporated in the further stage of the hardening reaction—at least partially—into the remaining polymer network. It thereby makes a major contribution to the strengthening and improving of the mechanical properties of the hardened sealing material. Thus, e.g. the shear modulus of the hardened adhesive/sealing material is, surprisingly, higher than that of the comparable cold-pumpable adhesive/sealing materials. This desired improvement can be used in the construction to increase the torsional rigidity of a vehicle body.

The adhesive/sealing masses according to the invention contain, in addition to the components mentioned already, further additives familiar to the specialist such as fillers, plasticizers, catalysts, adhesion promoters, antiageing agents and others besides, as used in the usual way in the compounding of such formulations. The masses can be produced e.g. in conventional planetary dissolvers. It is favourable to work at a temperature above the melting point of the component solid at room temperature.

The example described in the following for a single-component adhesive and sealing mass serves to explain the invention; this does not, however, mean that the invention relates only to single-component systems. Rather, the principle according to the invention can also be applied to multi-component systems.

The adhesive and sealing materials according to the invention are suitable for the gluing of components of the same or of different materials, in particular for the structural gluing of parts made from glass, metal, plastic, construction materials or wood. Because of their particular property profiles, they are outstandingly suitable for directly glazing automobile windows in motor-vehicle production.

EXAMPLES

Example 1

Production of a Liquid Polyurethane Prepolymer 4000 g of a polyoxypropylene ether triol having a molecular weight of 6000 g/mol and 640 g dioctylphthalate are dehydrated at 70° C. at reduced pressure and with passing through of dry nitrogen for about 1 hour, until the water content of the mixture is less than 0.05%. 510 g of pure, molten 4,4'-diphenyl methane diisocyanate is added under nitrogen. After the addition and a homogenization, 2.0 ml of a 10% solution of tin(II) octoate in xylene are added. After exothermy has subsided, one continues at 80° C. until a constant isocyanate content of about 1.7% is reached. A clear, colourless to slightly yellowy viscous liquid is obtained.

Example 2

Production of a Solid Polyurethane Prepolymer 4000 g of a polycaprolactone diol having a molecular weight of 2000 g/mol are melted, and mixed with 696 g toluylene diisocyanate (80:20 isomer mixture). It is stirred under nitrogen at 80° C. for ca. 3 hours, until a constant isocyanate content of about 3.3% is reached. A clear, colourless liquid is obtained, which hardens on cooling to a solid white mass.

Example 3

Production of an Adhesive/Sealing Mass 1080 g of the liquid prepolymer (as described in example 1), 600 g dioctylphthalate, and 900 g carbon black and 240 g finely-dispersed chalk are homogeneously mixed in a planetary mixer under vacuum, during which the composition heats up to ca. 70° C. 180 g of the prepolymer (example 2), previously melted at 50° to 60° C., are incorporated into this under vacuum. 1.2 g dibutyl tin dilaurate, dissolved in ten times the quantity of DOP, are finally stirred in under vacuum. A pasty, stable composition is obtained which is poured air-tight into cartouches prior to cooling. The properties of this adhesive/sealing mass are listed in Table 1.

TABLE 1

| Properties of the adhesive/sealing mass | |
| --- | --- |
| Skin-formation time | ca. 30 min |
| Thorough hardening after 24 h (standard climate 24/50) | ca. 4 mm |
| Shore A (DIN 53505) | 70 |
| Tensile strength (DIN 53504) | 9 MPa |
| E-modulus 100% (DIN 53504) | 2.7 MPa |
| Elongation at break (DIN 53504) | 450% |

FIG. 1 shows the shear stress/temperature behaviour of the sealing mass according to the invention compared with a standard commercial product of the upper viscosity class. The shear stress was measured at a shear of D=1.0 sec$^{-1}$.

It is clear that the sealing mass according to the invention is better and more easily processed at 40° to 50° C. than the standard commercial material, but does show a much higher shear stress (and therefore stability) at room temperature. The distinct improvement which can be achieved by the sealing mass according to the invention compared with standard commercial sealing mass is also shown in a tear-out-test. The loading which was required to tear out a motor vehicle side window pane 10 min. after the insertion of the pane into the car body flange was measured. The results are given in Table 2.

TABLE 2

| Load-bearing capacity of a side-window pane gluing, 10 min. after fitting the pane. | |
| --- | --- |
| standard commercial adhesive/sealing material (without component b) | 155 kg |
| sealing mass of example 3: | 270 kg |

Table 3 shows the force which must be applied in order to separate two glass plates glued together. An adhesive bead 100 mm in length and 7.0±0.2 g in weight was pressed together to a 3 mm layer thickness between two glass plates measuring 100×150 mm and pulled apart after waiting 30 min. Here, too, the advantages of the sealing mass according to the invention clearly come to light.

TABLE 3

| Pulling tests on two glass plates glued together, 30 min. after gluing | |
| --- | --- |
| Standard commercial, maximum-viscosity adhesive/sealing material (without component b) | 72 N |
| Sealing mass of example 3 | 176 N |

TABLE 4

| Holding power of an adhesive bead pressed between two plates with vertical suspension from one of the two plates: | |
| --- | --- |
| Standard commercial, maximum viscosity adhesive/sealing material | 160–200 g (corresponding to 8–10 g/cm$^2$ |

TABLE 4-continued

| Holding power of an adhesive bead pressed between two plates with vertical suspension from one of the two plates: | |
| --- | --- |
| (without component b) Sealing mass of example 3 | gluing area) 500–600 g (corresponding to 25–30 g/cm$^2$ gluing area) |

Table 4 shows what weight a 100 mm-long sealing material bead can hold weighing 7.0±0.2 g which was pressed together to a 3 mm layer thickness between two plates of EC sheet and glass without slipping if the arrangement is suspended in the vertical position from the EC plate immediately following compression. The glass plate hangs freely and exerts a corresponding static tensile load on the glue joint on the basis of its own weight.

Example 4

Production of a Solid, Non-Functional Oligomer Component 1000 g of a prepolymer having isocyanate end-positions corresponding to example 2 are melted at 70° C. and mixed with 80 g n-hexanol. It is left to react for another 3 h at 70° C. On being allowed to cool, the product solidifies to a solid, white mass which practically no longer contains isocyanate.

Example 5

Production of an Adhesive/Sealing Mass

An adhesive/sealing mass is prepared analogously to example 3 using the liquid prepolymer of example 1 and the oligomer component of example 4.

The shear stress/temperature curve of this adhesive/sealing mass corresponds largely to that of example 3 in FIG. 1.

The holding power of a sealing mass bead pressed between two plates also agrees with the value of example 3 in table 4.

This example shows that the special rheological properties achieved according to the invention can also be obtained with a non-functional additive. Compared with the adhesive/sealing mass from example 3, the mechanical strength of the hardened sealing mass is, as expected, lower, since the additive does not contribute to the polymer composite, but is present only as filler. Despite this, the final strengths achievable in this way are completely adequate for many applications.

Example 6

Production of an Adhesive/Sealing Mass Using a Paraffin Wax as Component b.

An adhesive/sealing mass is prepared analogously to example 3 except that, in place of the prepolymer of example 2, a hydrocarbon mixture (paraffin wax) melting at 50° to 55° C. is used.

With this formulation according to the invention, the described rheological properties also result, i.e. low viscosity and easy processability in heat, but a high degree of thickening and good holding power on cooling. At the same time the example illustrates that low-molecular-weight and completely inert organic compounds can also be suitable for this purpose, as long as they have only an appropriate melting range and are largely insoluble, both in the solid and liquid state, in the prepolymer/plasticizer phase. Only by this incompatibility does the additive acquire its typical character as a "meltable filler" and show the desired strong influence on the viscosity of the adhesive/sealant mass when exeeding or falling below its melting temperature.

We claim:

1. An adhesive and sealant composition based on reactive prepolymers consisting of a filler and a) at least one reactive prepolymer which is liquid at room temperature and b) at least one other component which is solid at room temperature, liquid at a temperature above 50° C. and at least partially incompatible with the liquid prepolymer (a).

2. An adhesive and sealant composition according to claim 1 wherein said component b) is a polymer or prepolymer.

3. An adhesive and sealant composition according to claim 2, wherein said polymer or prepolymer contains functional silane or mercapto groups.

4. An adhesive and sealant composition according to claim 1 wherein said components a) and b) contain prepolymers having isocyanate end-groups.

5. An adhesive and sealant composition according to claim 4 wherein said prepolymers are obtained from linear or branched polyols selected from the group consisting of polyethers, polyesters, polycarbonates, polycaprolactones, polycaprolactams and polybutadienes.

6. An adhesive and sealant composition according to claim 5, wherein the prepolymer present as component b) is formed from a polycaprolactone polyol.

7. An adhesive and sealant composition according to claim 4 wherein said prepolymers are reaction products of polyols with aromatic or aliphatic diisocyanates.

8. The process of producing an adhesive and sealant composition consisting of mixing a) at least one reactive prepolymer which is liquid at room temperature and b) at least one other component which is solid at room temperature, liquid at a temperature above 50° C. and at least partially incompatible with the liquid prepolymer, wherein said mixing is carried out at a temperature above the melting point of the component b) which is solid at room temperature.

9. The process of gluing together at least two rigid articles, consisting of applying to at least one of said articles an adhesive and sealant composition based on reactive prepolymers consisting of a filler and a) at least one reactive prepolymer which is liquid at room temperature and b) at least one other component which is solid at room temperature, liquid at a temperature above 50° C. and at least partially incompatible with the liquid prepolymer (a).

10. A process according to claim 9 wherein said component b) is a polymer or prepolymer.

11. A process according to claim 10 wherein said polymer or prepolymer contains functional silane or mercapto groups.

12. A process according to claim 9 wherein said components a) and b) contain prepolymers having isocyanate end-groups.

13. A process according to claim 12 wherein said prepolymers are obtained from linear or branched polyols selected from the group consisting of polyethers, polyesters, polycarbonates, polycaprolactones, polycaprolactams and polybutadienes.

14. A process according to claim 13 wherein the prepolymer present as component b) is formed from a polycaprolactone polyol.

15. A process according to claim 12 wherein said prepolymers are reaction products of polyols with aromatic or aliphatic diisocyanates.

16. A process according to claim 9 wherein said articles are selected from articles made of glass, metal, plastic, construction materials and wood.

17. A process according to claim 9 wherein one of said articles comprises an automobile window pane.

* * * * *